(12) United States Patent
Weerakoon et al.

(10) Patent No.: US 7,031,720 B2
(45) Date of Patent: Apr. 18, 2006

(54) PRE-EMPTIVE BANDWIDTH ALLOCATION BY DYNAMIC POSITIONING

(75) Inventors: Don Dilshan Weerakoon, Gaithersburg, MD (US); Abdol Hamid Aghvami, Strand (GB)

(73) Assignee: Kings College London, London (GB)

( * ) Notice: Subject to any disclaimer, the term of this patent is extended or adjusted under 35 U.S.C. 154(b) by 390 days.

(21) Appl. No.: 10/182,424

(22) PCT Filed: Jan. 25, 2001

(86) PCT No.: PCT/GB01/00288

§ 371 (c)(1),
(2), (4) Date: Nov. 1, 2002

(87) PCT Pub. No.: WO01/56323

PCT Pub. Date: Aug. 2, 2001

(65) Prior Publication Data

US 2003/0125034 A1    Jul. 3, 2003

(30) Foreign Application Priority Data

Jan. 26, 2000 (GB) .................................. 0001804

(51) Int. Cl.
*H04Q 7/20* (2006.01)
(52) U.S. Cl. ............... 455/452.2; 455/445; 455/450; 455/452.1; 455/455; 370/322; 370/329; 370/395.4; 370/395.43
(58) Field of Classification Search ............... 455/445, 455/450, 452.1, 452.2, 455, 512; 370/322, 370/329, 335, 337, 341, 395.4, 395.43
See application file for complete search history.

(56) References Cited

U.S. PATENT DOCUMENTS

| | | | |
|---|---|---|---|
| 5,734,867 A | 3/1998 | Clanton et al. | 395/500 |
| 5,748,629 A * | 5/1998 | Caldara et al. | 370/389 |
| 5,935,218 A * | 8/1999 | Beyda et al. | 709/251 |
| 5,974,465 A * | 10/1999 | Wong | 709/234 |
| 5,983,278 A * | 11/1999 | Chong et al. | 709/235 |
| 6,314,103 B1 * | 11/2001 | Medhat et al. | 370/395.2 |
| 6,324,184 B1 * | 11/2001 | Hou et al. | 370/468 |
| 6,594,277 B1 * | 7/2003 | Chiang et al. | 370/465 |
| 6,654,346 B1 * | 11/2003 | Mahalingaiah et al. | 370/235 |
| 6,680,906 B1 * | 1/2004 | Nguyen | 370/229 |
| 6,690,678 B1 * | 2/2004 | Basso et al. | 370/468 |

FOREIGN PATENT DOCUMENTS

| | | | |
|---|---|---|---|
| EP | 0782364 | * | 2/1997 |
| EP | 0782364 | | 7/1997 |

OTHER PUBLICATIONS

Ayyagari et al. "Admission control with Priority" Mobile Networks and Applications, 199, vol. 4. Issue 3, pp. 209-218.*

D. Ayyagari, A. Ephremides, "Admission Control With Priority: Approaches for Multi-Rate Wireless Systems", Mobile Networks and Applications, 199, vol. 4, Issue 3, pp. 209-218.

* cited by examiner

*Primary Examiner*—Stephen D'Agosta
(74) *Attorney, Agent, or Firm*—Baker Botts LLP

(57) ABSTRACT

In mobile communication and radio systems there is a pre-emptive bandwidth allocation by dynamic partitioning the total spectrum available to allow mobile user groups with high priority services to access greater amounts of bandwidth than mobile user groups with lower priority services when the network is overloaded.

12 Claims, 1 Drawing Sheet

(a). Physical channel occupancy by multiple services;
(b). Logical channel occupancy by multiple services

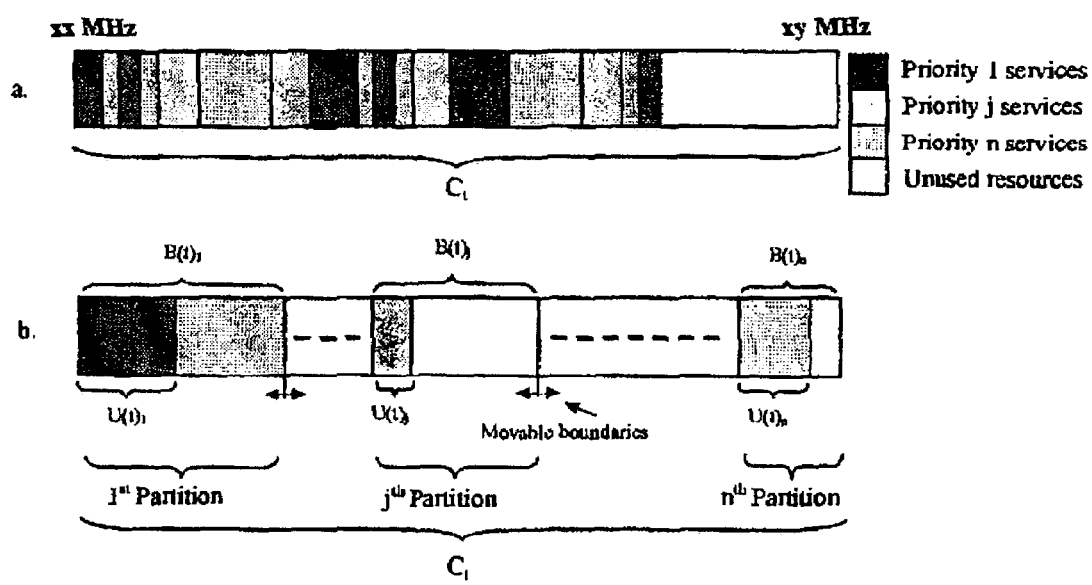
Figure 1: (a). Physical channel occupancy by multiple services;
(b). Logical channel occupancy by multiple services

PRE-EMPTIVE BANDWIDTH ALLOCATION BY DYNAMIC POSITIONING

CROSS REFERENCE TO RELATED APPLICATION(S)

This application is the national stage of PCT/GB01/00288, filed Jan. 25, 2001, which is incorporated herein by reference in its entirety.

The present invention relates to a system for allocating the bandwidth in wireless and mobile telephone systems and to enable the system to perform up to the necessary quality of service (QoS). In particular the invention relates to a pre-emptive scheme which uses a bandwidth allocation by dynamic partitioning of the spectrum available.

BACKGROUND OF THE INVENTION

In a mobile telephone system the users use up the bandwidth as they make a call and when all the allocated bandwidth has been used up the next user cannot log on and so cannot use the system. With increasing use of multimedia services and the limited availability of the radio frequency spectrum the capacity of the system can be exceeded and this situation will be made worse by the advancement in multimedia services. In order to reduce this problem the future wireless systems will need to use more efficient and sophisticated resource allocation methods to increase the network capacity and guarantee the QoS.

Some traffic in a mobile telephone network is considered to be of higher priority than other traffic and the operators of this higher priority traffic could be prepared to pay a higher rate for preferred allocation of bandwidth.

DETAILED DESCRIPTION OF THE INVENTION

According to the invention there is provided a method for allocating bandwidth in a wireless communication system which method comprises allocating each user a pre-defined priority ranking and each predefined priority level has a pre-emptive section of the bandwidth so that, when a first user logs on, the first user uses that allocated pre-emptive part of the bandwidth, if that allocated pre-emptive part of the bandwidth is full the call from the first user uses a part of the bandwidth not being used which belongs to some other priority level, if all the bandwidth is being used a call from a user of lower priority, which is outside the allocated pre-emptive part of the bandwidth of the said lower priority user, is terminated and the call from higher priority user is allocated that part of the bandwidth previously used by the terminated lower priority user and optionally a user from a high priority group may also be pre-empted if all the lower priority groups occupy bandwidth within the allocated limit and a high priority group occupies bandwidth outside the limit.

The terminated call can be placed in a queuing system so that it can be re-connected when bandwidth becomes available.

Optionally the system can be adapted so that a user of lower priority can have his call terminated even though he is operating in his allocated preemptive bandwidth if a call of sufficiently high priority is made.

The allocation of the bandwidth which can be made by the proposed scheme is also valid for both Time Division Multiple Access (TDMA) on the basis of the time allocation of each user and Code Division Multiple Access (CDMA)) on the basis of the code used by each user to identify that user.

Preferably the size of each pre-emptive partition can be changed if the QoS requirement changes i.e. the boundaries of the partitions are moveable.

An embodiment of the invention is illustrated in the drawings in which:

(a) shows the allocation of bandwidth in order of logging on and (b) shows allocation according to the invention (logical bandwidth occupation).

The bandwidth is from xx MHz to xy MHx and in (a), as the various calls arrive the bandwidth is used up and, when it is full the next call cannot be connected regardless of its priority level.

In (b) each priority level l, j, n is allocated a pre-emptive part of the bandwidth $B(t)_l$. $B(t)_n$ so the bandwidth is divided into partitions as shown. When a call is received it takes part of the allocated bandwidth according to its priority, when that part of the allocated bandwidth is full it is allocated part of the unused bandwidth. If $U(t)_j < B(t)_j$ then there is no problem. If $U(t)_j > B(t)_j$ then the call uses part of the unused bandwidth. If there is no unused bandwidth then the system checks if any other priority group occupies more bandwidth than its corresponding pre-emptive bandwidth limit. This search is carried out from the lowest priority group to the highest. If any group that occupies more bandwidth than the corresponding pe-emptive bandwidth limit is found, then a user from that group (randomly selected) will be forced to terminate and the released channel will be allocated to the user requesting a channel. If all the groups occupy their corresponding pre-emptive bandwidth limit, the user requesting bandwidth will be denied access.

An example of the operation of an embodiment of scheme of the invention is described below.

EXAMPLE

The network will classify every new call and handover request originated into one of the priority levels according to QoS requirements.

At the time of bandwidth request, if there are sufficient resources available, it will be allocated to that user regardless of priority level that user belongs to. However, if at the time of bandwidth request the network is overloaded and all the channels are occupied, the following system operation will be performed.

If the user requesting for bandwidth belongs to the priority group $G_j$, the network will calculate the bandwidth occupied by all the users belonging to that group. Then, the following equation is checked $$U(t)_j > B(t)_j \tag{1}$$

If the above inequality is satisfied, i.e., the group $G_j$ occupies more bandwidth than that available in $B(t)_j$, then the mobile user requesting the bandwidth will be denied access to the network.

In the case where the above inequality is not satisfied, i.e., users in group $G_j$ occupy less bandwidth than granted in their $B(t)_j$ logical partition, the system will perform the following steps.

The system checks if any other priority group occupies more bandwidth than its corresponding pre-emptive bandwidth limit. This search is carried out from the lowest priority group to the highest, i.e. from $G_n$ to $G_l$. If any group that occupies more bandwidth than the corresponding preemptive bandwidth limit is found, then a user from that group (randomly selected) will be forced to terminate and the released channel will be allocated to the user requesting a channel. If all the groups occupy their corresponding pre-emptive bandwidth limit, the user requesting bandwidth will be denied access.

In order to allocate pre-emptive bandwidth it is assumed that new calls for a given cell follow a Poisson distribution. Furthermore, it is assumed that the call arrival of a particular user is independent from all the other users.

The mean call arrival rates of the types of service with priority 1 to n are $\lambda_1, \ldots \lambda_n$ respectively.

The unencumbered call duration, Tu, is the amount of time that the call would remain in progress if it could continue to completion without forced termination due to pre-emption by other service or handover failure. This time is exponentially distributed with parameter $1/\mu$. New Call arrivals from a type of service with priority j have mean unencumbered call duration according to a negative exponential distribution with parameter $1/\mu_j$.

The Mean channel holding time, Th, this is the amount of time a channel is occupied by a call before it is released. This time is the minimum of the unencumbered call duration and the time a channel is occupied before user is pre-empted. That is:

$$Th = \text{Min}(T_u, T_p) \qquad (2)$$

Where $T_u$ and $T_p$ are respectively the unencumbered call duration and the time that a call spend within a cell before force termination due to pre-emption by another user.

The blocking probability is defined as the probability that new call arrivals are denied access to the system. In the proposed system, blocking events occur when the system is overloaded and, the bandwidth used by users belonging to that group is greater than or equal to the allocated limit $(U(\tau)_j \geq B(\tau)_j)$ or when the bandwidth used by users belonging to that group is less than the allocated limit $(U(\tau)_j < B(\tau)_j)$ and all the other type of user groups occupy bandwidth within the allocated limit. The blocking probability of the pre-emptive bandwidth allocation scheme is now derived.

The system is overloaded at a given time $\tau$ when $$\sum_{j=1}^{n} U(\tau)_j = C_t \qquad (3)$$

Where, $C_t$ is the total bandwidth and $U(\tau)_j$ is the bandwidth occupied by users belonging to the priority group j at time $\tau$.

Users that belong to the $j^{th}$ group occupy exactly the bandwidth limit (total bandwidth assigned to that particular type of service) or more than it when $$U(\tau)_j \geq B(\tau)_j \qquad (4)$$

Where, $B(\tau)_j$ is the bandwidth allocated in the $j^{th}$ logical partition at time $\tau$.

On the contrary, all the priority groups occupy bandwidth within the allocated limit when $$U(\tau)_k \leq B(\tau)_k \text{ for } k=1 \ldots n \qquad (5)$$

So, the blocking probability for the service type $j$, $P_b(j)$ can be determined by:

$$P_b(j) = A \cdot P\left[C_t = \sum_{j=1}^{n} U(\tau)_j\right][P[U(\tau)_k \leq B(\tau)_k] + P[U(\tau)_j \geq B(\tau)_j]] \qquad (6)$$

For $k=1 \ldots n;\ k \neq j$;

Where $$A = \frac{\frac{\lambda_j}{\mu_j}}{\sum_{k=1}^{n} \frac{\lambda_k}{\mu_k}}$$

Where, $\lambda_j$ and $\mu_j$ are the call arrival rate and call departure rate of priority type j respectively.

For a system with n priority levels, the overall blocking probability, $P_b$ can be determined by:

$$P_b = \sum_{j=1}^{n} P_b(j) \qquad (7)$$

B) Forced termination

The Forced termination probability $P_{FT}(j)$ for the service type j is defined as the probability that a j type call, which is initially admitted to the system, is subsequently interrupted during its lifetime. The interruption of a call can be produced as explained below.

An engaged call of the type of service j may be interrupted and forced to terminate if the following conditions are fulfilled:

(i) the system is overloaded, i.e., equation (3) is satisfied (ii) the total bandwidth occupied by type j users is greater than its corresponding logical partition bandwidth, i.e., equation (1) is satisfied (iii) a new call generated by a user of any other type k arrives to the system and request a channel (iv) the total bandwidth occupied by type k users is less than its corresponding logical partition bandwidth, i.e., $U(\tau)_k < B(\tau)_k$ is satisfied (v) type j is the least priority group (w.r.t. k) that occupies more bandwidth than allocated in the logical partition.

The forced termination probability, for the pre-emptive bandwidth allocation scheme $P_{FT}(j)$, for priority group j when a user from priority group k arrives to the system can be determined by:

$$P_{FT}(j) = A \cdot P\left[C_t = \sum_{i=1}^{n} U(\tau)_i\right]P[U(\tau)_k < B(\tau)_k]P[U(\tau)_j > B(\tau)_j] \qquad (8)$$

Where priority group j is the least priority group (w.r.t. priority group k) that satisfies equation (1).

For a system with n priority levels, the overall force termination probability, $P_{FT}$ can be determined by:

$$P_{FT} = \sum_{j=1}^{n} P_{FT}(j) \qquad (9)$$

The scheme of the present invention uses a pre-emptive bandwidth allocation by dynamic partitioning the total spectrum available to allow mobile user groups with high priority services to access greater amounts of bandwidth than mobile user groups with low priority services when the network is overloaded. The scheme does not reduce overall trunking efficiency and the network can still guarantee QoS for high priority services under overloaded conditions

The invention claimed is:

1. A method of allocating bandwidth in a wireless communication system which method comprises (i) allocating each user a pre-defined priority ranking level; (ii) allocating each pre-defined priority ranking level a pre-emptive section of the bandwidth wherein, when a first user logs on, said first user uses his allocated pre-emptive section of the bandwidth, and wherein, if that allocated pre-emptive section of the bandwidth is full, the call from said first user uses a part of the bandwidth not being used by any other user, and wherein, if all the bandwidth which has been allocated to users of other priority ranking levels to that of said first user is being used, a call from a user of lower priority than the priority of said first user and which is outside the allocated pre-emptive section of the bandwidth of said lower priority user is terminated and the call from said first user, which is of higher priority, is allocated that part of the bandwidth previously used by said terminated lower priority user and wherein if all the users of a lower priority ranking level than said first user occupy their pre-emptive section of the bandwidth, and a user of a higher priority ranking level than said first user occupies bandwidth outside the allocated pre-emptive section of the bandwidth, the call of said higher priority user is terminated and the bandwidth allocated to the said first user.

2. A method according to claim 1 in which the terminated call is placed in a queuing system so that it can be reconnected when bandwidth becomes available.

3. A method according to claim 1 in which the allocation of the bandwidth is made on the basis of Time Division Multiple Access.

4. A method according to claim 3 in which the size of each pre-emptive section can be changed if the QoS requirement changes.

5. A method according to claim 1 in which the allocation of the bandwidth is made on the basis of Code Division Multiple Access.

6. A method according to claim 5 in which the size of each pre-emptive section can be changed if the QoS requirement changes.

7. A method according to claim 1 in which the allocation of the bandwidth is made on the basis of Code Division Multiple Access.

8. A method according to claim 1 in which the size of each pre-emptive section can be changed if the QoS requirement changes.

9. A method according to claim 1 wherein said user of lower priority is selected by searching priority ranking levels from lowest to highest.

10. A method according to claim 1 wherein said wireless communication system comprises a mobile telephone network.

11. A method of allocating bandwidth in a wireless communication system which method comprises (i) allocating each user a pre-defined priority ranking level (ii) allocating each pre-defined priority ranking level a pre-emptive section of the bandwidth wherein, when a first user logs on, said first user uses his allocated pre-emptive section of the bandwidth, and wherein, if that allocated pre-emptive section of the bandwidth is full, the call from said first user uses a part of the bandwidth not being used by any other user, and wherein, if all the bandwidth which has been allocated to users of other priority ranking levels to that of said first user is being used, a call from a user of lower priority than the priority of said first user and which is outside the allocated pre-emptive section of the bandwidth of said lower priority user is terminated and the call from said first user, which is of higher priority, is allocated that part of the bandwidth previously used by said terminated lower priority user, and wherein if the priority of said first user has a ranking a pre-determined level higher than that of the said user of lower priority, said call of that user of lower priority is terminated irrespective of whether or not said user of lower priority is operating within his allocated pre-emptive section of the bandwidth.

12. A method of allocating bandwidth in a wireless communication system which method comprises (i) allocating each user a pre-defined priority ranking level (ii) allocating each pre-defined priority ranking level a pre-emptive section of the bandwidth wherein, when a first user logs on, said first user uses his allocated pre-emptive section of the bandwidth, and wherein, if that allocated pre-emptive section of the bandwidth is full, the call from said first user uses a part of the bandwidth not being used by any other user, and wherein, if all the bandwidth which has been allocated to users of other priority ranking levels to that of said first user is being used, a call from a user of lower priority than the priority of said first user and which is outside the allocated pre-emptive section of the bandwidth of said lower priority user is terminated and the call from said first user, which is of higher priority, is allocated that part of the bandwidth previously used by said terminated lower priority user, and wherein said user of lower priority is selected by searching priority ranking levels from lowest to highest, and if said lower priority user forms part of a group of lower priority users each having the same priority ranking level, said lower priority user is selected randomly from said group.

* * * * *